US012597304B1

(12) United States Patent
Romero, Jr. et al.

(10) Patent No.: US 12,597,304 B1
(45) Date of Patent: Apr. 7, 2026

(54) AD-HOC RECORDING SYSTEM COMBINING DATA FROM MULTIPLE SOURCES

(71) Applicant: UIPCO, LLC, San Antonio, TX (US)

(72) Inventors: Jose L Romero, Jr., San Antonio, TX (US); Andre Rene Buentello, San Antonio, TX (US); Gregory David Hansen, Fuquay Varina, NC (US); Dustin Bowen Bitter, Lehi, UT (US); Brennen Michael Ricks, San Antonio, TX (US); Nina Cooper, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 127 days.

(21) Appl. No.: 18/334,937

(22) Filed: Jun. 14, 2023

(51) Int. Cl.
| | |
|---|---|
| *G07C 5/08* | (2006.01) |
| *B60W 50/14* | (2020.01) |
| *G06V 20/40* | (2022.01) |
| *G06V 20/56* | (2022.01) |
| *G06V 20/62* | (2022.01) |

(52) U.S. Cl.
CPC ........... G07C 5/0866 (2013.01); B60W 50/14 (2013.01); G06V 20/44 (2022.01); G06V
20/56 (2022.01); G06V 20/625 (2022.01); B60W 2050/143 (2013.01)

(58) Field of Classification Search
CPC ................ G07C 5/0866; B60W 50/14; B60W 2050/143; G06V 20/44; G06V 20/56; G06V 20/625
See application file for complete search history.

(56) References Cited

U.S. PATENT DOCUMENTS

| | | | | |
|---|---|---|---|---|
| 2021/0304218 | A1* | 9/2021 | Bahrami | .................. H04L 63/08 |
| 2022/0301427 | A1* | 9/2022 | Ueno | ......................... H04N 7/18 |
| 2022/0319192 | A1* | 10/2022 | Tani | ........................ G16Y 10/40 |
| 2023/0162309 | A1* | 5/2023 | Yang | ...................... G06Q 50/26 |
| | | | | 705/325 |

* cited by examiner

*Primary Examiner* — Hesham K Abouzahra
(74) *Attorney, Agent, or Firm* — Plumsea Law Group, LLC

(57) ABSTRACT

A method of using a network of sensors in reconstructing an accident includes recording, by a first vehicle, a first video of the accident using a first camera; detecting, by the first vehicle, a presence of a second camera at the accident; obtaining, by the first vehicle, contact information associated with the second camera upon determining the presence of the second camera at the accident; retrieving, by the first vehicle, a second video of the accident from the second camera using the contact information; and reconstructing, by the first vehicle, the accident using the first video and the second video

13 Claims, 16 Drawing Sheets

901

1201

1202

1203

```
REQUEST
CONTACT
INFORMATION
```

```
DATABASE

1. CONTACT A / IDENTIFIER
2. CONTACT B / LOCATION DATA / TIME DATA
3. CONTACT C / LOCATION DATA / TIME DATA
4. CONTACT D / LOCATION DATA / TIME DATA
```

```
CONTACT
INFORMATION
```

1301 — CAPTURE VIEW OF ENVIRONMENT

1302 — DETECT / PREDICT EVENT

1303 — OTHER LOCAL CAMERA?

COLLECT DATA FROM LOCAL CAMERA — 1304

1305 — DOES ONBOARD UNIT HAVE CAPABILITY TO CREATE RECONSTRUCTION?

CREATE RECONSTRUCTION WITH ONBOARD UNIT — 1306

1307 — SEND DATA TO COLLECTOR SYSTEM

1308 — CREATE RECONSTRUCTION WITH COLLECTOR SYSTEM

MAKE RECONSTRUCTED DATA AVAILABLE — 1309

AD-HOC RECORDING SYSTEM COMBINING DATA FROM MULTIPLE SOURCES

TECHNICAL FIELD

This disclosure relates generally to systems and methods for recording and retrieving data following an accident, and more particularly to accident reconstruction using data from multiple sources.

BACKGROUND

Current methods of obtaining video of incidents are cumbersome, and in many cases, not possible. For example, only permanently installed cameras near an incident can be reliably identified. Further, there are no methods for obtaining potentially relevant footage.

SUMMARY

In one aspect, the disclosure provides a method of using a network of sensors in reconstructing an accident comprises recording, by a first vehicle, a first video of the accident using a first camera; detecting, by the first vehicle, a presence of a second camera at the accident; obtaining, by the first vehicle, contact information associated with the second camera upon determining the presence of the second camera at the accident; retrieving, by the first vehicle, a second video of the accident from the second camera using the contact information; and reconstructing, by the first vehicle, the accident using the first video and the second video.

In another aspect, a method of operating an accident reconstruction system that maintains a database of videos collected by a plurality of cameras comprises receiving video data collected by the plurality of cameras and associated with a plurality of users, wherein the video data is associated with identifying data; receiving, from a first user of the plurality of users, a user request for data about a vehicle of the first user, the request including at least one parameter; searching, using the at least one parameter, the video data for video data matching the at least one parameter; finding a portion of the video data matching the at least one parameter that depicts the vehicle of the user; and returning the portion of the vide data matching the at least one parameter and depicting the vehicle of the user to the first user.

In still another aspect, a method includes detecting, by a first vehicle, an identifier of a second vehicle in a first video recorded by the first vehicle; predicting, by the first vehicle using the first video, an event involving the second vehicle; obtaining, by the first vehicle, contact information associated with the second vehicle from a collector system; and sending an alert to the second vehicle, wherein the alert causes the second vehicle to perform an action based on the alert.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DETAILED DESCRIPTION

Embodiments are directed to a system and method for retrieving data from a plurality of vehicles. The retrieval of the data may be performed through connections between the vehicles, such that the vehicles form an ad-hoc system for predicting events and recording incidents. The connections between the vehicles may be formed in real-time and/or created at a later time. In some examples, images or videos from different vehicles may be stitched together to create an improved, more complete, view of an environment in which an event is predicted or an incident has occurred.

In some examples, a system associates related data from different vehicles. This data may include audio data, video data, location data, or sensor data more generally. Through the system, different vehicles may be associated to an incident, a location, or any object in the environment to trigger tangible reactions to predicted threats and detected incidents.

Figure 1:
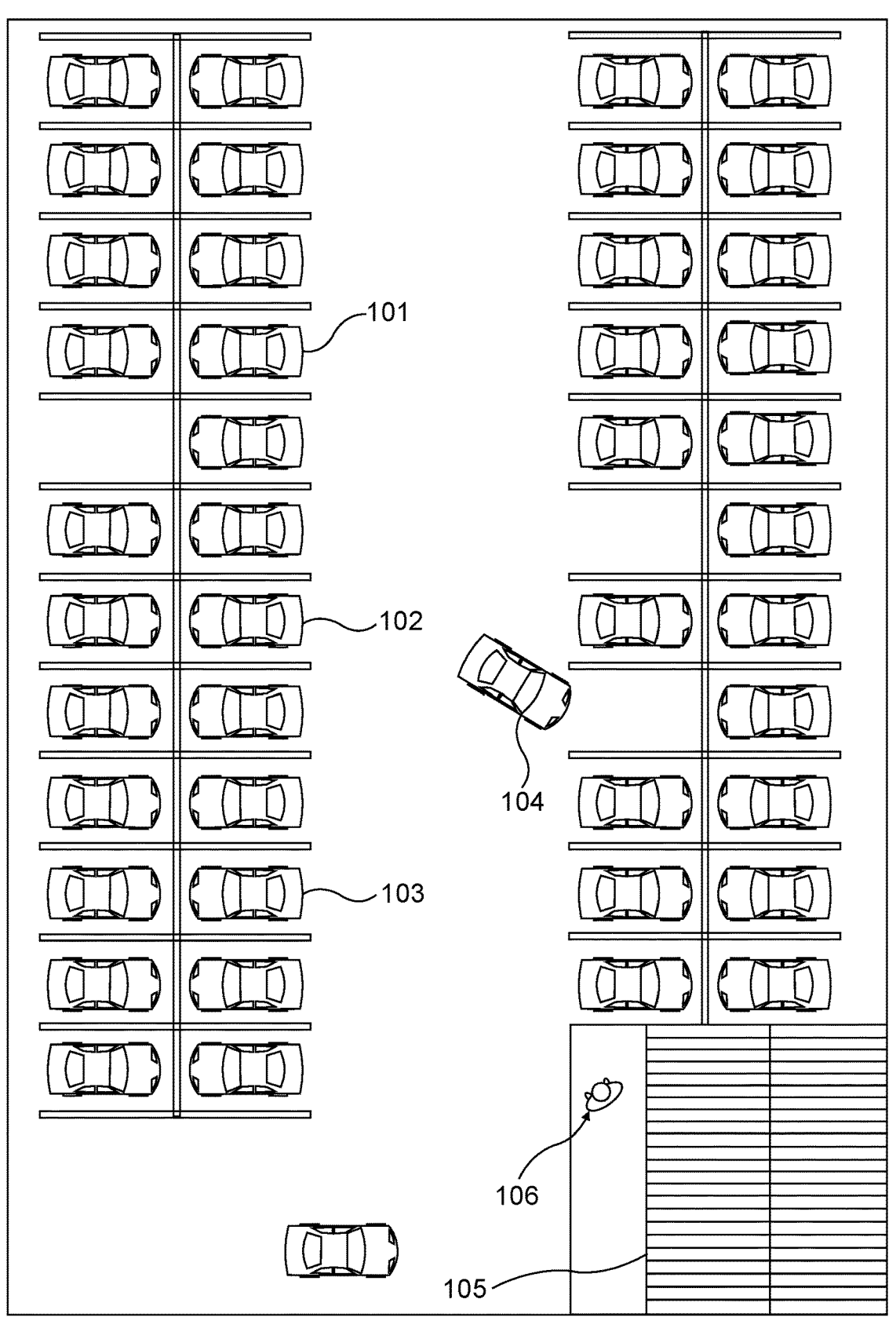
FIG. 1 is a schematic illustration of an environment according to some embodiments.

FIG. 1 is a schematic illustration of an environment according to some embodiments. A number of vehicles, including stationary and moving vehicles, are located in the environment. For example, a first vehicle 101, a second vehicle 102 and a third vehicle 103 may be stationary, while a fourth vehicle 104 may be in motion. People, buildings, infrastructure, and other objects may also be located in the environment. As shown in FIG. 1, at least a building 105 and a pedestrian 106 are located in the environment.

Figure 2:
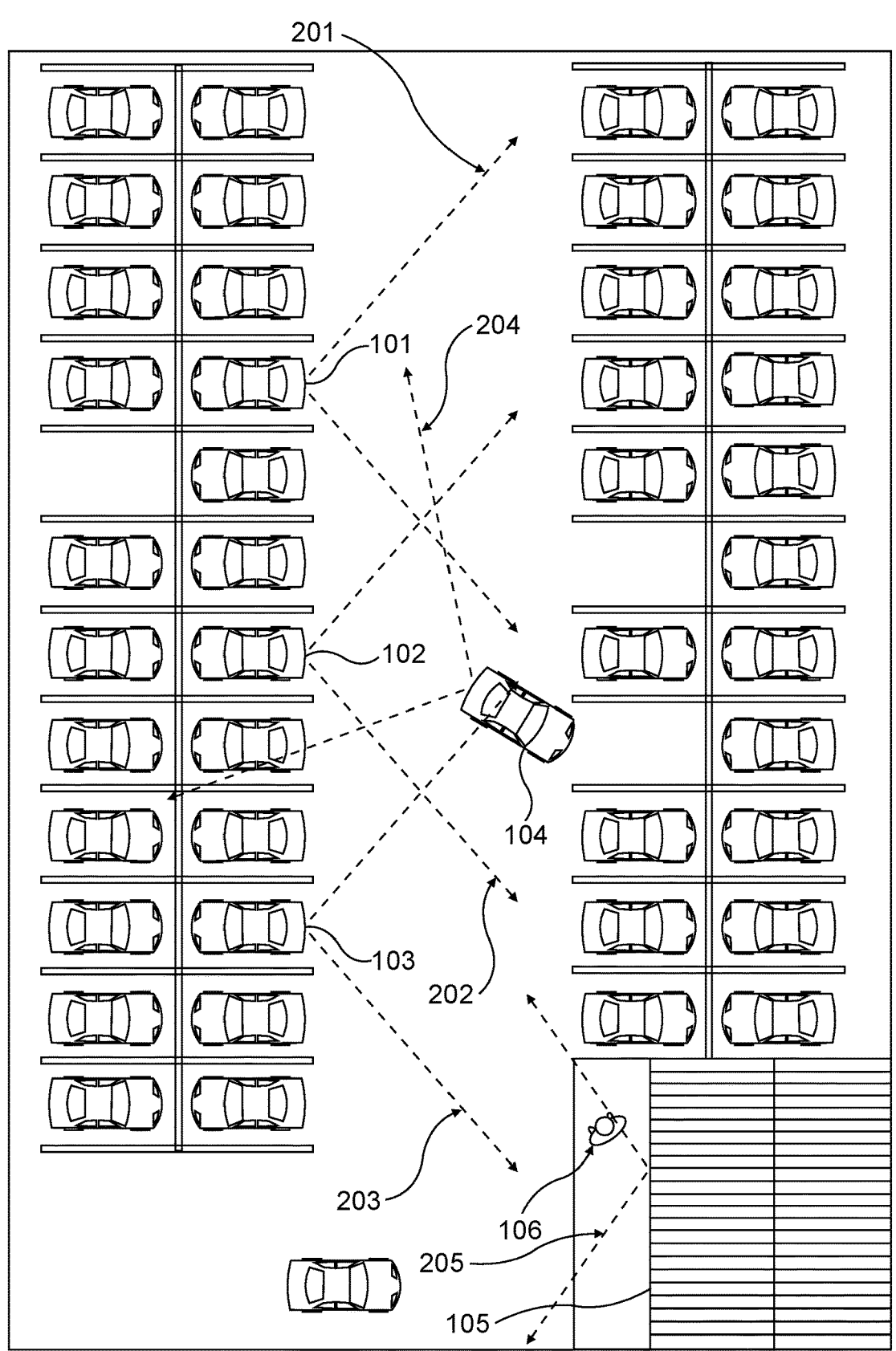
FIG. 2 is a schematic illustration of the environment of FIG. 1 including a plurality of cameras.

FIG. 2 is a schematic illustration of the environment, in which a plurality of cameras are located according to some embodiments. In the drawing, each camera is identified by its field of view. For example, a first camera is identified by a first field of view 201, a second camera is identified by a second field of view 202, a third camera is identified by a third field of view 203, a fourth camera is identified by a fourth field of view 204 and a fifth camera is identified by a fifth field of view 205. A field of view illustrates a portion of the environment that may be captured by a camera. The first though fourth cameras may be vehicle cameras. These vehicle cameras may be a backup camera, a dashboard camera, or a rear view camera. The fifth camera may be a security camera located at the building 105. Other cameras, and data capture sensors more generally, are contemplated.

As shown in FIG. 2 different fields of view may overlap. For example, at least the first, second, and fourth fields of view overlap. Furthermore, different sensors may record data that overlaps in other ways. For example, overlapping time stamps associated with data collected by accelerometers or microphones. According to some embodiments, overlapping data may be combined to create improved impressions of events in the environment.

Figure 3:
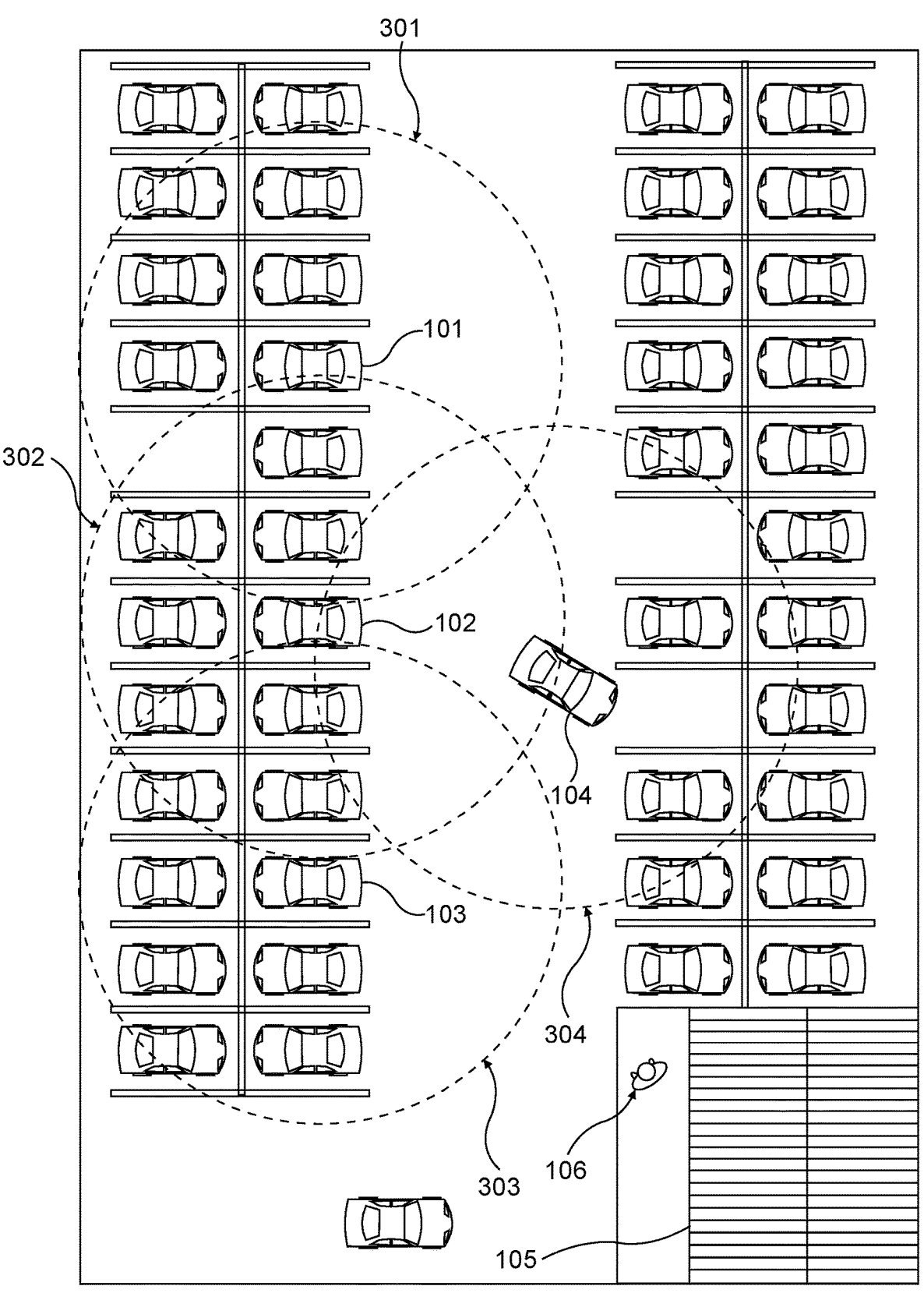
FIG. 3 is a schematic illustration of the environment of FIG. 1 including a plurality of network connected devices.

FIG. 3 is a schematic illustration of the environment in which a plurality of network connected devices may communicate. For example, a first network connected device is identified by a first wireless signal 301, a second network connected device is identified by a second wireless signal 302, a third network connected device is identified by a third wireless signal 303 and a fourth network connected device is identified by a fourth wireless signal 304. The first network connected device, the second network connected device, the third network connected device and the fourth network connected device may be vehicle installed wireless devices. These wireless devices may have connections using one or more protocols, such as near field communication (NFC), 5G and Bluetooth® protocols. As shown in FIG. 3 the different wireless signals may overlap, such that different vehicles may communicate directly with one another. In some examples, the vehicles communicate through a network (see for example, FIG. 5).

In some cases, a camera may have a wired connection. For example, the fifth camera may have a wired connection to a network. The fifth camera may have a wireless connection to the network. The fifth camera may have connections using one or more protocols, such as ethernet, near field communication (NFC), 5G and Bluetooth® protocols. In the case of a wireless connection, the fifth camera may have a wireless signal that overlaps with other wireless signals, such that the fifth camera may communicate directly with other cameras, such as the third camera associated with the third wireless signal 303.

Figure 4:
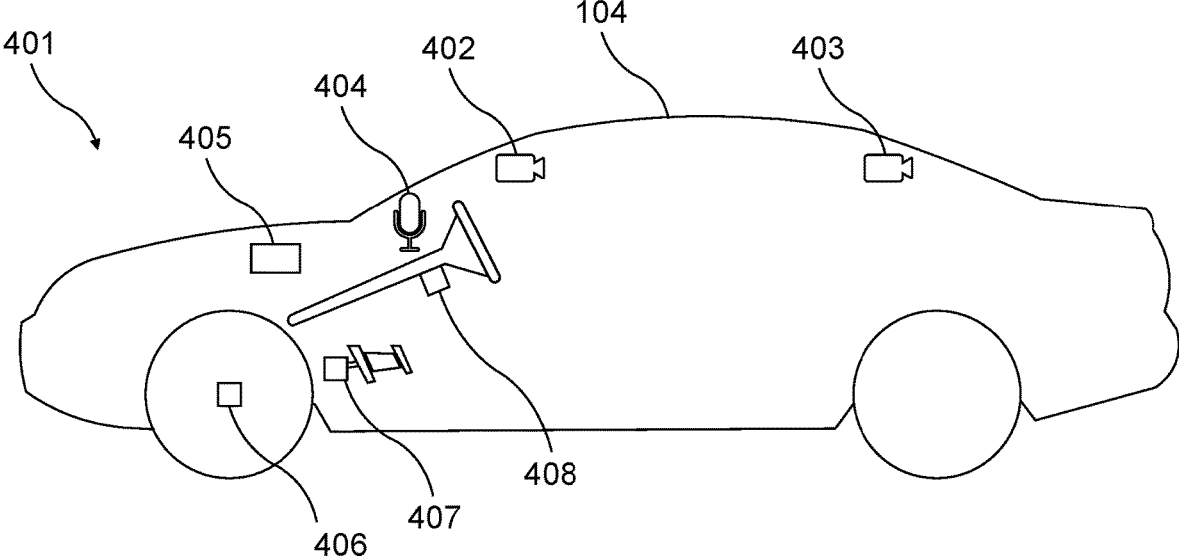
FIG. 4 is a schematic illustration of example sensors according to some embodiments.

FIG. 4 is a schematic illustration of an example vehicle (e.g., the fourth vehicle 104). Sensory data from the vehicle can be stored locally or passed to remote system. The vehicle may include sensors 401. As seen in FIG. 4, the sensors 401 can include an internal camera 402, an external camera 403 and a microphone 404. The internal camera 402 and external camera 403 can capture still images and/or video of the interior, exterior, and/or surrounding environment of vehicle. The microphone 404 may capture audio information inside and/or outside of the vehicle. Using one or more of the sensors 401, such as the internal camera 402 and the external camera 403, as well as the microphone 404, the vehicle may be able to predict or detect an event in the environment. This allows the vehicle to make decisions about what data to store and/or communicate.

Figure 10:
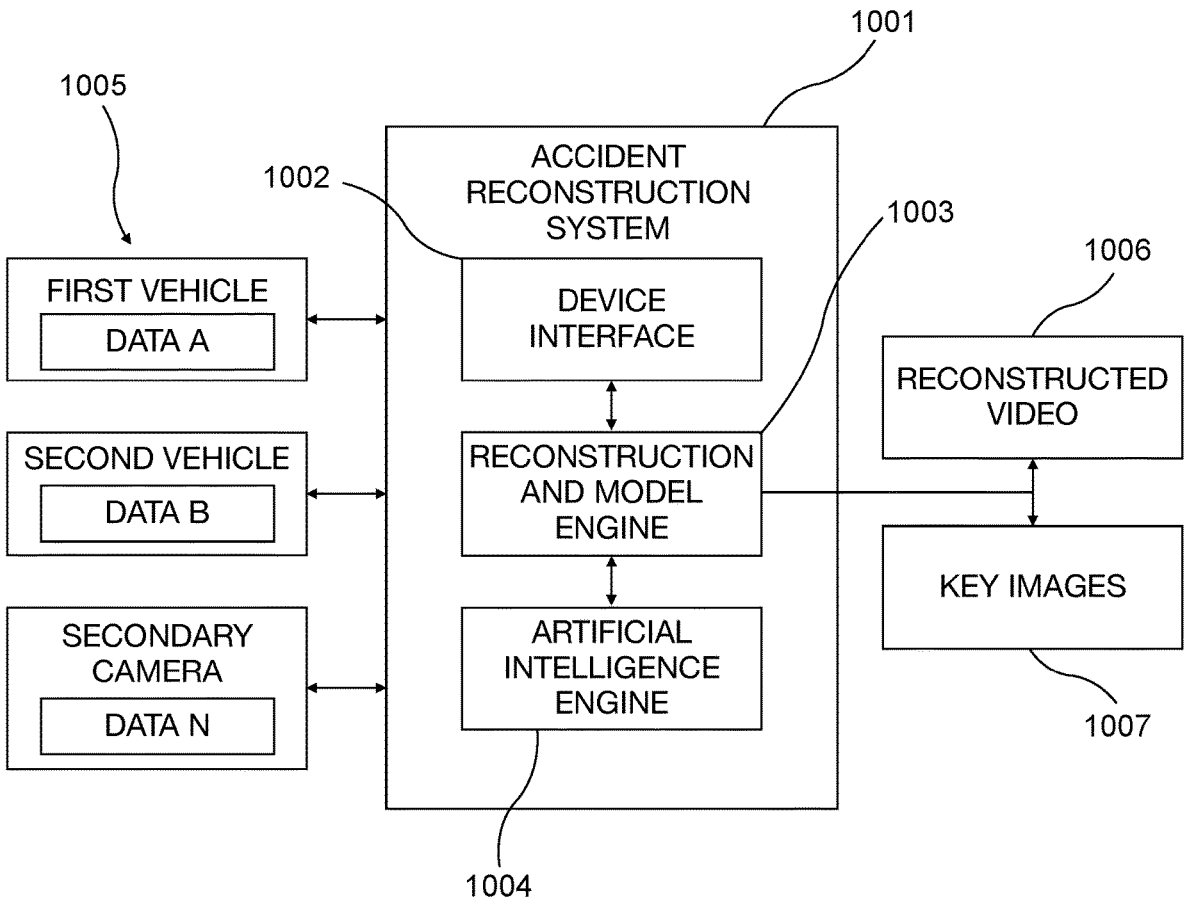
FIG. 10 is a schematic illustration of an accident reconstruction system according to some embodiments.

Sensed information may be sent to a remote system, such as a collector system 501 (see FIG. 5) or an accident reconstruction system 1001 (see FIG. 10). The sensed information may include data output from acceleration sensors 405, wheel speed sensors 406, pedal sensors 407 and steering angle sensors 408. Although not shown, some embodiments could also include LIDAR and/or RADAR based sensors for sensing objects (such as other cars) in the environment. Information from one or more of these sensors can be stored and used to create a record of an event.

Figure 5:
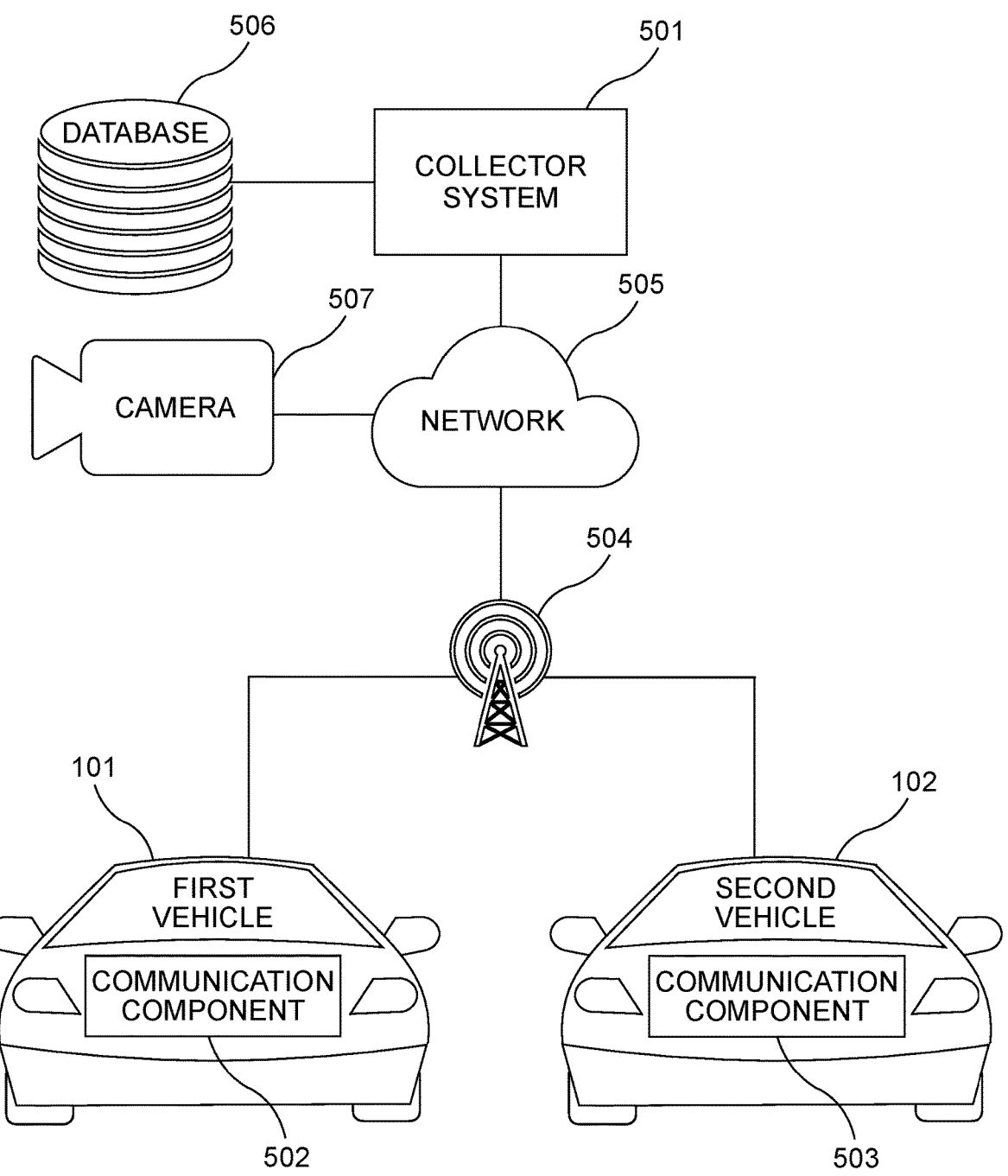
FIG. 5 is a schematic illustration of a system for collecting and recording data according to some embodiments.

FIG. 5 is a schematic illustration of a system in which vehicles (e.g., the first vehicle 101 and the second vehicle 102) provide video data to the collector system 501. It should be understood that the accident reconstruction system 1001 of FIG. 10 is an example of the collector system 501. As shown in FIG. 5, each vehicle may include one or more communication components. For example, the first vehicle 101 includes a first communication component 502 and the second vehicle 102 includes a second communication component 503. Communication components may include cellular network components for communicating over cellular networks, Wi-Fi components for communicating over Wi-Fi networks, and other communication components. Using one or more communication components, the vehicles may communicate with the collector system 501 via, for example, a wireless communication node 504 and a network 505. The collector system 501 may include or have access to a database 506, which may be used to store data retrieved through the network 505 from the vehicles and/or other sources, such as a camera 507.

A communication component, such the first communication component 502 of the first vehicle 101, may allow a device to communicate wirelessly. In this case, the communication component is illustrated as facilitating a wireless connection; however, wired connections may also be used. For example, a communication component of a security system including the fifth camera identified by the fifth field of view 205 in FIG. 2 may include a wired serial bus such as a universal serial bus or a parallel bus, among other connections. The communication component may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or ZIGBEE® technology, among other possibilities.

In some embodiments, a system may be composed of an ad-hoc network of computer systems and sensors (hereinafter the ad-hoc network) thereof. The ad-hoc network can capture multiple views of the environment. The ad-hoc network may include, for example, vehicle cameras, doorbell cams, automatic teller machine cameras, and any camera with a view of the environment and an ability to upload images to a network. In some embodiments, the ad-hoc network captures a continuous view of an incident as it occurred through the environment (e.g., over a city block or a parking lot) using multiple viewpoints and fields of view, which may be used to generate a continuous video of an incident from multiple sources.

Figure 6:
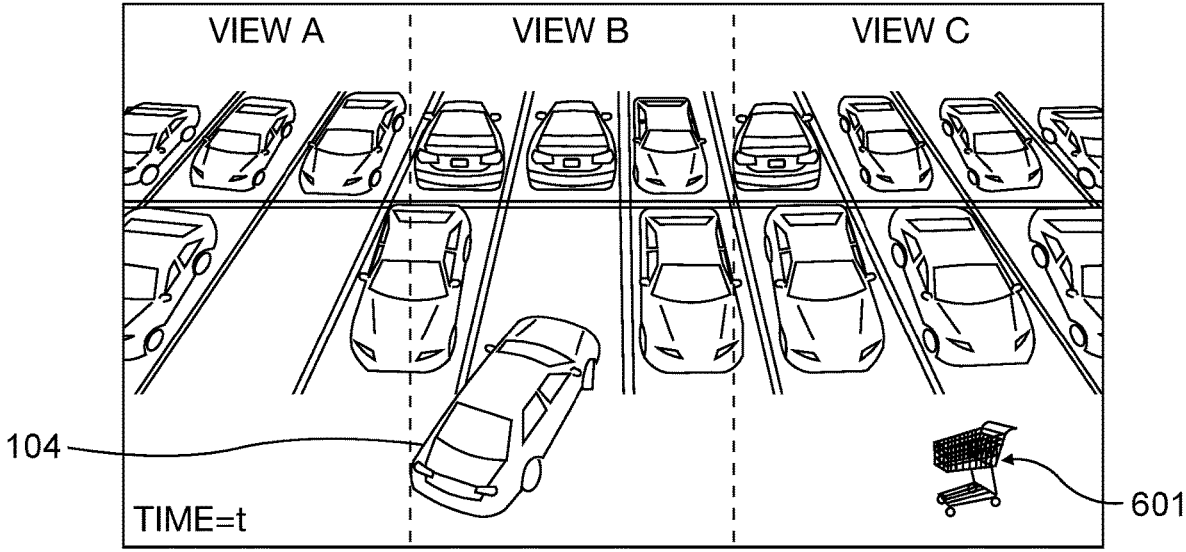
FIG. 6 is a schematic illustration of an accident reconstruction over time according to some embodiments.
Figure 7:
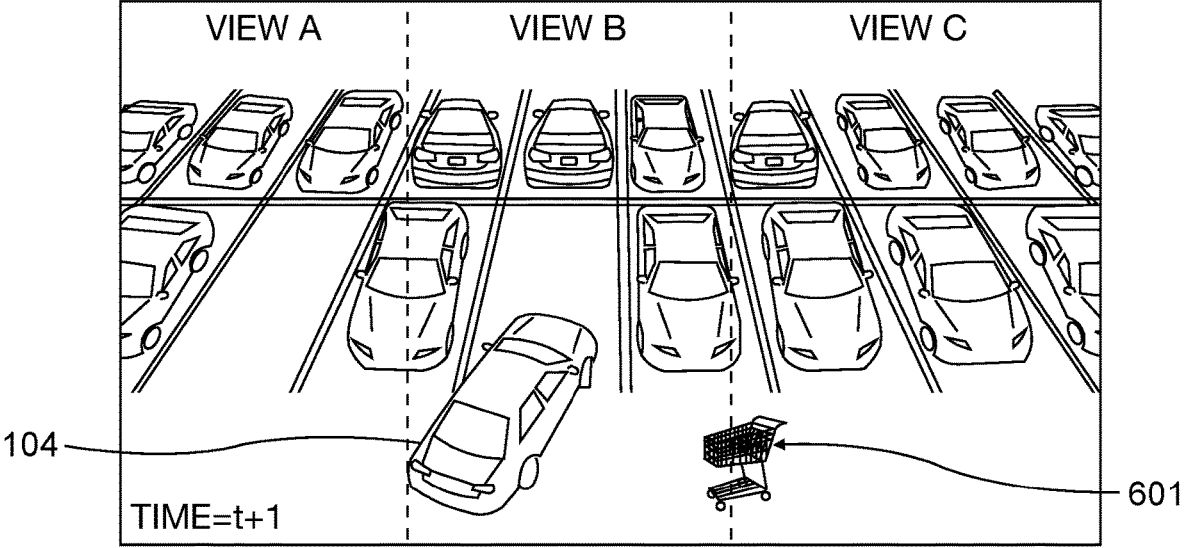
FIG. 7 is a schematic illustration of an accident reconstruction over time according to some embodiments.
Figure 8:
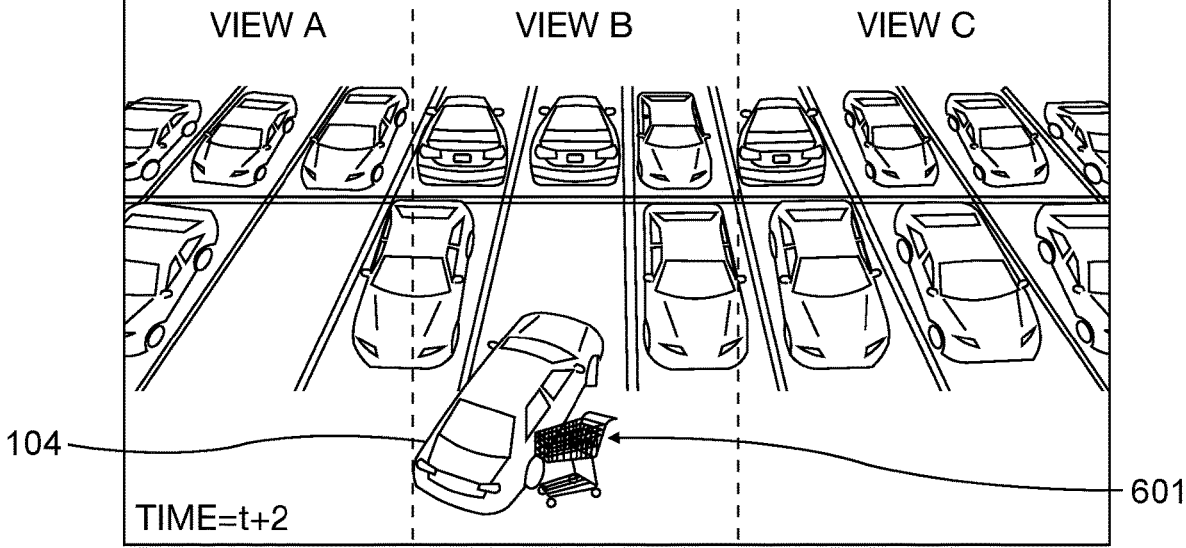
FIG. 8 is a schematic illustration of an accident reconstruction over time according to some embodiments.

As illustrated in FIGS. 6-8, View A corresponds to the first field of view 201, View B corresponds to the second field of view 202 and View C corresponds to the third field of view 203. According to some example, the Views A-C may be stitched together into a combined view, which may capture an event. In FIGS. 6-8, an accident event is captured showing a shopping cart 601 moving through the environment and impacting the fourth vehicle 104. That is, FIG. 6 shows a video image at time=t, FIG. 7 shows a video image at time=t+1 and FIG. 8 shows a video image at time=t+2. In this way, the system achieves an improved (e.g., more complete) view of the incident with convenient access to recorded video. In particular, the system may allow an insurance adjuster to view an incident using video efficiently obtained from multiple sources.

In some examples, each view may be displayed in a different user-interface window or a different portion of a window, arranged in a spatially correct way using location data for the different cameras, and coordinated by time stamp in order to create an impression of a single image or video, or to improve an impression of an event that occurred in the environment. Other methods of stitching may be used. In some cases, the fields of view captured by the cameras may be cropped and aligned, wherein the views displayed create an impression of a single video. For example, the method may align the views to objects detected in the different fields of view.

Figure 9:
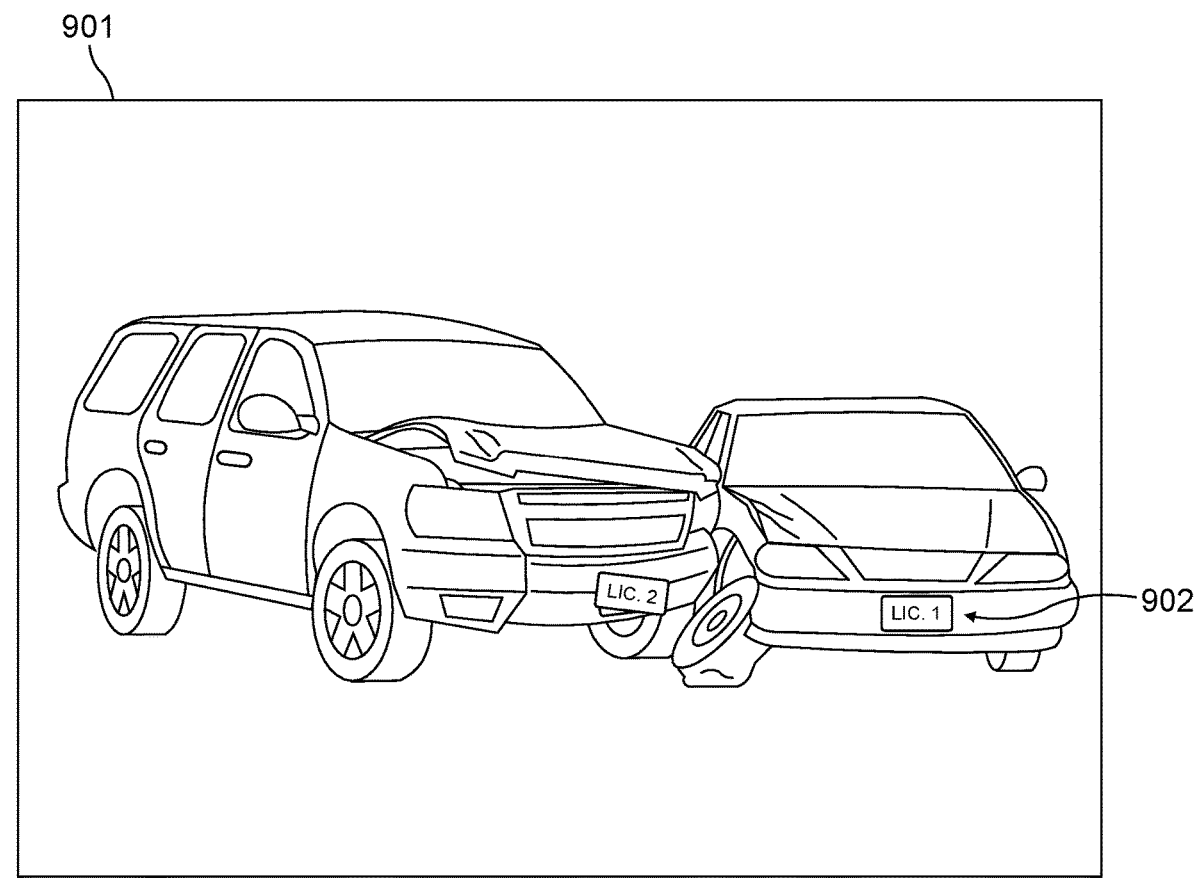
FIG. 9 is a schematic illustration of a captured image according to some embodiments.

In some embodiments, when an accident occurs, such as depicted in image 901 of FIG. 9, the system includes a service database for storing video and/or logging camera identifying information for later access to stored video. For example, the images or video may be stored locally by the vehicles, on a service database, or on automaker's video database. In some embodiments, the database of video attaches location information to each view.

Referring to FIG. 10, an accident reconstruction system 1001 includes a device interface 1002, a reconstruction and model engine 1003, and an artificial intelligence engine 1004. The accident reconstruction system 1001 takes data from two or more data sources 1005, such as vehicle cameras. These data sources 1005 may record and provide data including video of an environment and detected events. For example, data A may be data from a first vehicle and include recorded video, an indication that an accident event has occurred, and identifying data for other nearby devices, e.g., cameras. The data may be stored by each data source with the collector system 501 having a database 506 as shown in FIG. 5. The stored data, stored in the database 506, may be searched by the collector system 501 for data related to a request received from a user.

In an example where a vehicle has detected an accident event and provided data to the accident reconstruction system 1001, the accident event may be confirmed by the artificial intelligence engine 1004 through image processing performed by the accident reconstruction system 1001. The device interface 1002 may request data from other devices, such as those identified by the first vehicle. In some examples, the device interface 1002 may search the database 506 for data stored by devices identified by the first vehicle. This data may be from a second vehicle, which provides Data B, and a stationary camera, which provides Data n. Other devices may provide additional data.

The device interface 1002 may include hardware and/or software based interfaces, such as application programming interfaces (APIs) that enable accident reconstruction system 1001 to receive sensory information and/or other retrieved data (for example, data retrieved from third party databases).

Information collected by the accident reconstruction system 1001 can be filtered (if needed) and input into the reconstruction and model engine 1003. For example, overlapping views may be cropped to eliminate duplicate information. In one example, video from different sensors having different views may be adjusted to more closely align edges of different views. The reconstruction and model engine 1003 may convert video data from different sources into a reconstructed video of an accident 1006. In some examples, the reconstruction and model engine 1003 may extract key images 1007 from the information collected. The reconstruction and model engine 1003 may use any known methods in machine vision and/or machine learning more broadly in order to reconstruct a video of the accident and/or identify key images. In some cases, the artificial intelligence engine 1004 may be used to facilitate transforming the raw data into a reconstructed video. In other cases, artificial intelligence and/or machine learning modules could be integrated into the reconstruction and model engine 1003.

Figure 11:
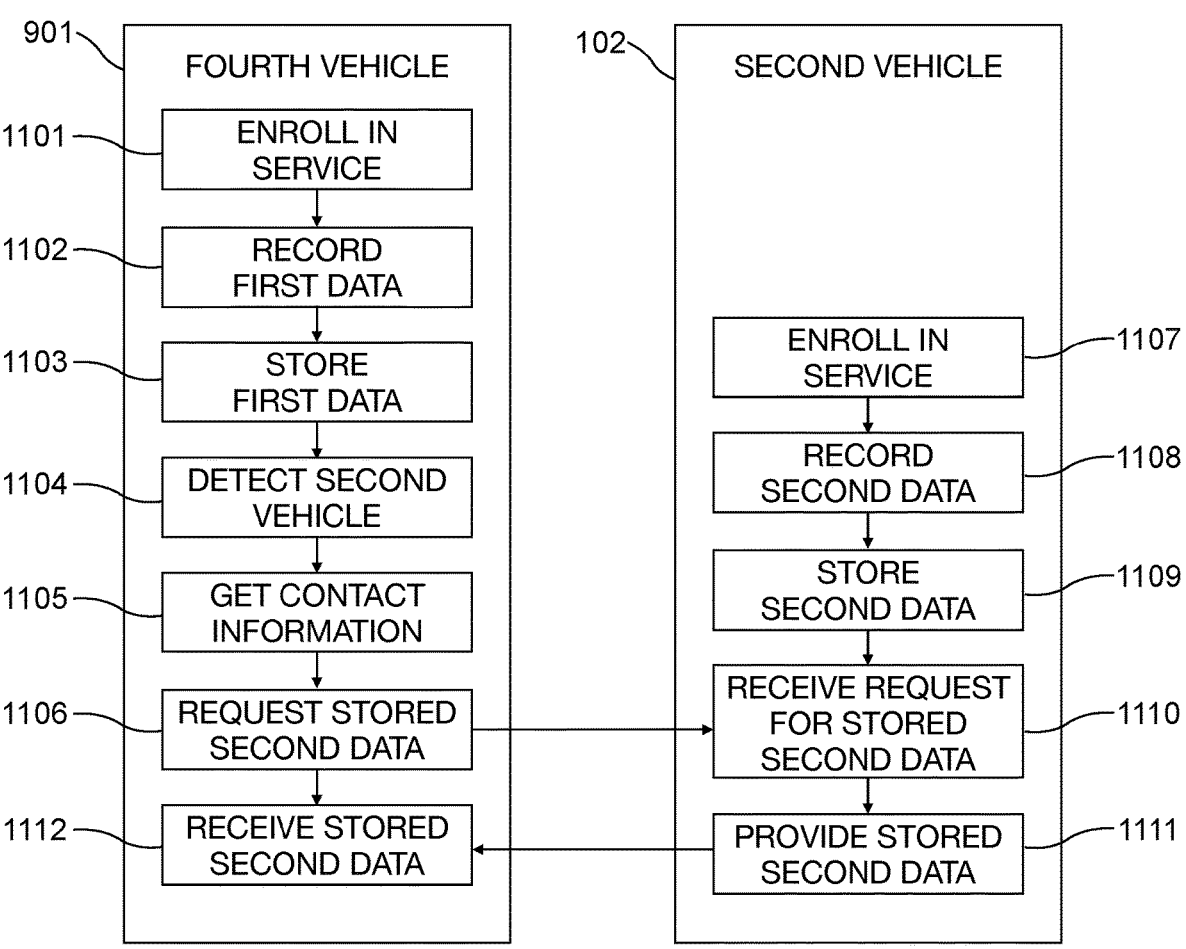
FIG. 11 is a schematic illustration of a data retrieval method according to some embodiments.

In some embodiments and referring to FIG. 11, an owner of the fourth vehicle 104 may notice damage to the vehicle and want to obtain video of a time when the owner suspects the damage may have occurred. As illustrated, the owners of the fourth vehicle and the second vehicle 102 are enrolled in a data sharing service, where the owner of the fourth vehicle has enrolled at step 1101 and the owner of the second vehicle 102 step 1107. The enrollment may include an authorization to allow access to recorded data. In this way, data may be shared between vehicles and owners of the vehicles.

The fourth vehicle will have recorded first data at step 1102 and the second vehicle will have recorded second data, such as audio and/or video data, at step 1108. Similarly, the fourth vehicle may store the recorded first data at step 1103 and the second vehicle may store the recorded second data at step 1109. This data may be stored locally or remotely. The stored data may include video data captured by cameras of the respective vehicles, as well as location and time stamps. In one example, the location may be recorded GPS data. According to at least one aspect, data may be pushed to an owner automatically, for example, in a case where the system has detected an accident. In this way, the owner of the fourth vehicle 104 may automatically receive data about the accident.

Figure 12:
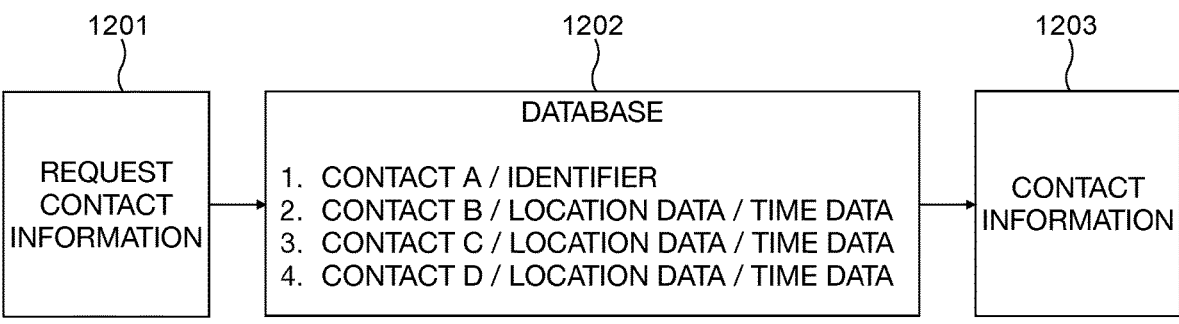
FIG. 12 is a schematic illustration of a database system according to some embodiments.

According to at least one example, having noticed damage to the fourth vehicle, the owner of the vehicle may use a device (e.g., the accident reconstruction system 1001) to perform an analysis to detect the second vehicle at step 1104 in the stored first data. This detection at step 1104 may include optical character recognition of license plates in the first data recorded by the fourth vehicle. For example, as illustrated in FIG. 9, a license plate number 902 (i.e., "Lic. 1") of the second vehicle may be recognized in the image 901. The detection may include a review of wireless signal identifiers detected by the fourth vehicle during some time window, e.g., the previous 24 hours, where a wireless signal identifier of the second vehicle is registered with a database 1202 (such as illustrated in FIG. 12). For example, the wireless signal identifier of the second vehicle may be registered with the database 1202 when the user enrolls with the accident reconstruction system 1001.

According to another example, the detection at step 1104 may include recording, by the fourth vehicle, a first location and a first time stamp associated with the accident, and providing the first location and the first time stamp associated with the accident to the database 1202, which matches the first location and the first time stamp to location and time stamp data provided by the second vehicle.

Having detected a presence of the second vehicle, the contact information for the second vehicle may be looked up using a data sharing service including the database (such as illustrated in FIG. 12) at step 1105. This lookup may allow the accident reconstruction system 1001 and/or the device of the owner to obtain contact information for the second vehicle based on location and time stamp data associated with the accident, extracted identifiers from recorded video, and scanned wireless signal identifiers.

As illustrated in FIG. 12, the request 1201 may include location and time stamp data associated with the accident, extracted identifiers from recorded video, or scanned wireless signal identifiers, and the database 1202 may return matching contact information 1203. The accident reconstruction system 1001 and/or the owner's device may use the contact information to request stored second data from the second vehicle at step 1106. The second vehicle may receive the request at step 1110 and provide the stored second data at step 1111. The accident reconstruction system 1001 and/or the owner's device may receive the stored second data at step 1112. This received data may be used to reconstruction an event that caused the damage.

According to some embodiments, the accident reconstruction system 1001 may be the collector system 501 having the database 506 as shown in FIG. 5. For example, the database 1202 may be an example of the database 506, which is accessible to the accident reconstruction system 1001. The accident reconstruction system 1001 may store data, such as video and audio data, received from the first vehicle and the second vehicle in the database 1202. The stored data may be associated with the contact information stored in the database 1202. For example, vehicle B may provide video data (e.g., stored data B), and which may be associated with certain contact information, such as Contact B. As illustrated in FIG. 12, Contact B may provide location information and time stamp information for video data provided by the vehicle.

An association of the stored data and contact information may be made within a same data structure. For example, the stored data may be an element of a record including the contact information in the database 1202. In some examples, the association may be may using a link from the database 1202 storing the contact information to the stored data, such as video data, in another memory or database. In at least one example, the association is made using a junction table logically connecting two or more databases. In some embodiments, the stored data, such as video capturing an accident, associated with some particular contact information may be retrieved from the accident reconstruction system 1001 and returned with the contact information.

Figure 13:
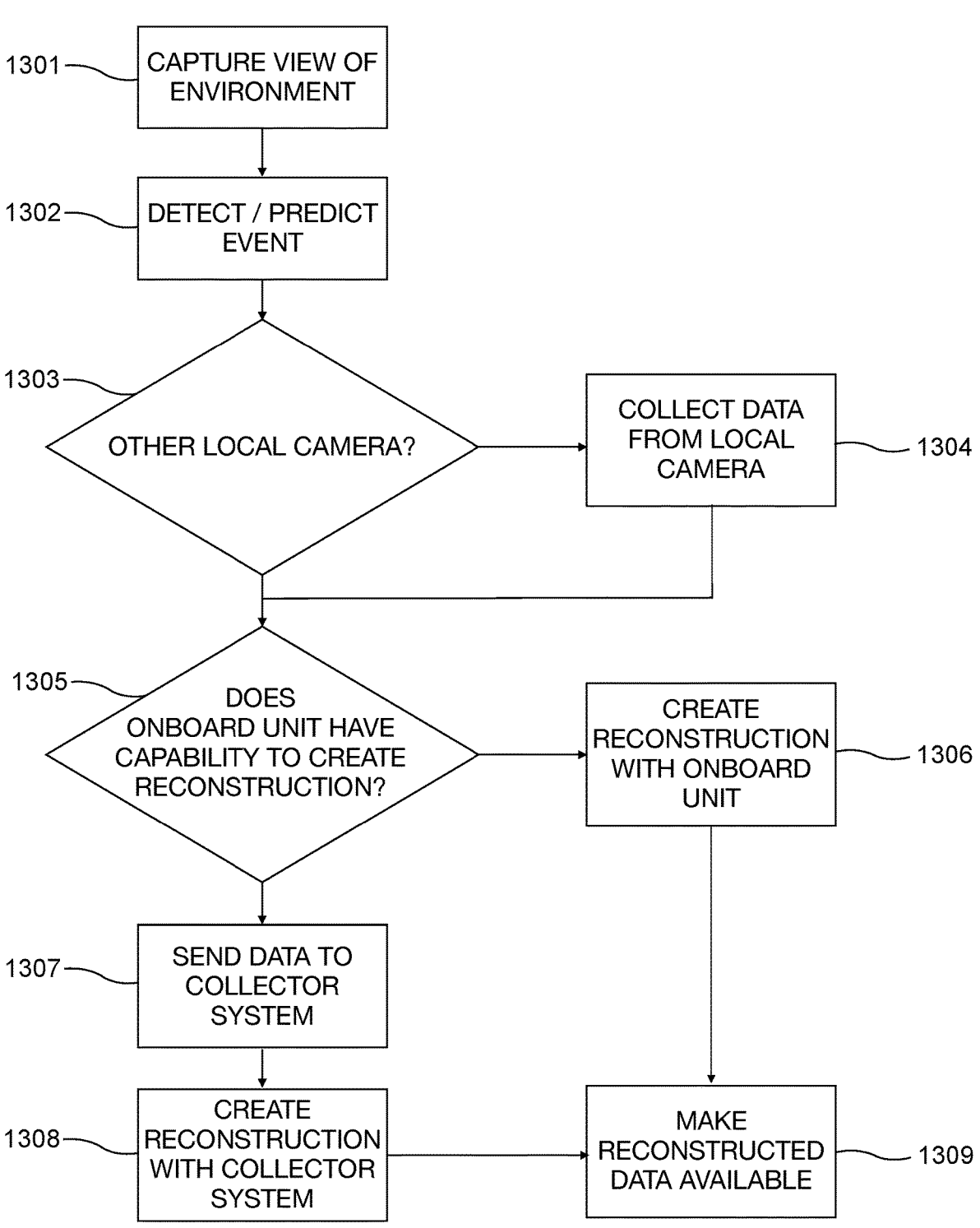
FIG. 13 is a schematic illustration of a reconstruction method according to some embodiments.

In some embodiments and referring to FIG. 13, a view of an environment may be captured by a first system having a camera at step 1301, and the first system may detect or predict an event at step 1302. The event may be detected by analysis of video or images of the captured view. For example, an event may be detected by a processor of the first system in a case where the camera captures a view of a collision of two vehicles or other objects or detects an impact using an accelerometer. The first system may determine whether there are other systems in the area at step 1303. The determination at step 1303 may include scanning for wireless signals in the area and recording identifying information, such as a Service Set Identifier (SSID). The SSID may be used to identify recorded data from a second system. In another example, the determination at step 1303 may include steps of the method illustrated in FIG. 11. Upon identifying a source of the recorded data from the second camara, recorded data from the first system and the second system may be collected at step 1304. The data collection at step 1304 may be performed by the first system, by an accident reconstruction system 1001, or more generally by a collector system 501.

The first system may determine whether it has a capability to create a reconstruction of the event at step 1305. For example, the first system may determine whether it includes an imaging processing software product for correlating and aligning different views of the environment. If the first system has a capability to reconstruct the event, a reconstruction of the event may be created at step 1306 using data collected at step 1306. Example reconstructions are shown in FIG. 6-8. If the first system does not have a capability to reconstruct the event, the captured view and identifying information may be sent to a collector system at step 1307, where the reconstruction may be created at step 1308.

It should be understood that the collection of data may be performed by the collector system at step 1304. The reconstruction, created by the collector system or the first vehicle, may be made available at step 1309. For example, the reconstruction may be transmitted to an owner of a vehicle involved in the event, an insurance provider associated with a vehicle involved in the event, or stored for retrieval by some party, such as law enforcement.

In some examples, the reconstruction, created by the collector system or the first vehicle, may be automatically made available at step 1309 such that the owner of a vehicle involved in an accident may automatically receive data about the accident. In some cases, the owner may receive data about the accident before the owner is aware that the accident has occurred.

Figure 14:
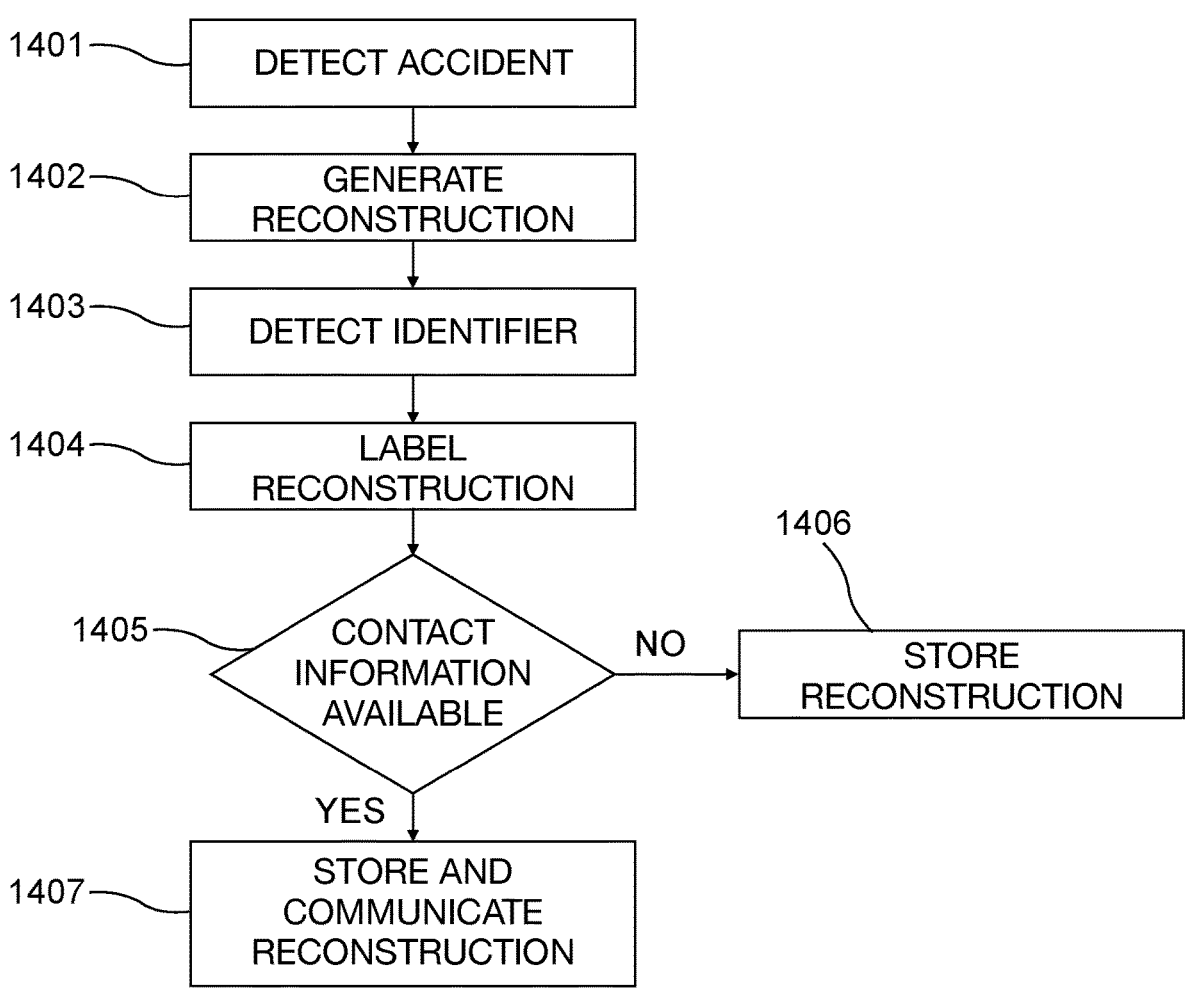
FIG. 14 is a schematic illustration of a data storage method according to some embodiments.

In some embodiments and referring to FIG. 14, a device may detect an accident at step 1401, generate a reconstruction at step 1402 (see for example, FIG. 13), and detect an identifier of a vehicle involved in the accident at step 1403. The device may determine the presence of the other vehicle camera(s) in a vicinity at step 1403 by, for example, optical character recognition of license plates or by detecting wireless signals. The device may label the reconstruction at step 1404, for example, with the identifier of the vehicle involved in the accident. At step 1405 the device determines whether contact information is available, for example, by looking up the identifier in a database. This contact information may be, for example, for the vehicle involved in the accident, an associated insurance provider, or first responders. In the case that contact information is not available, the device may store the reconstruction for later retrieval at step 1406. In a case where the contact information is available, the device may store the reconstruction and communicate the reconstruction (or a link thereto) to the party or parties identified by the contact information at step 1407.

Figure 15:
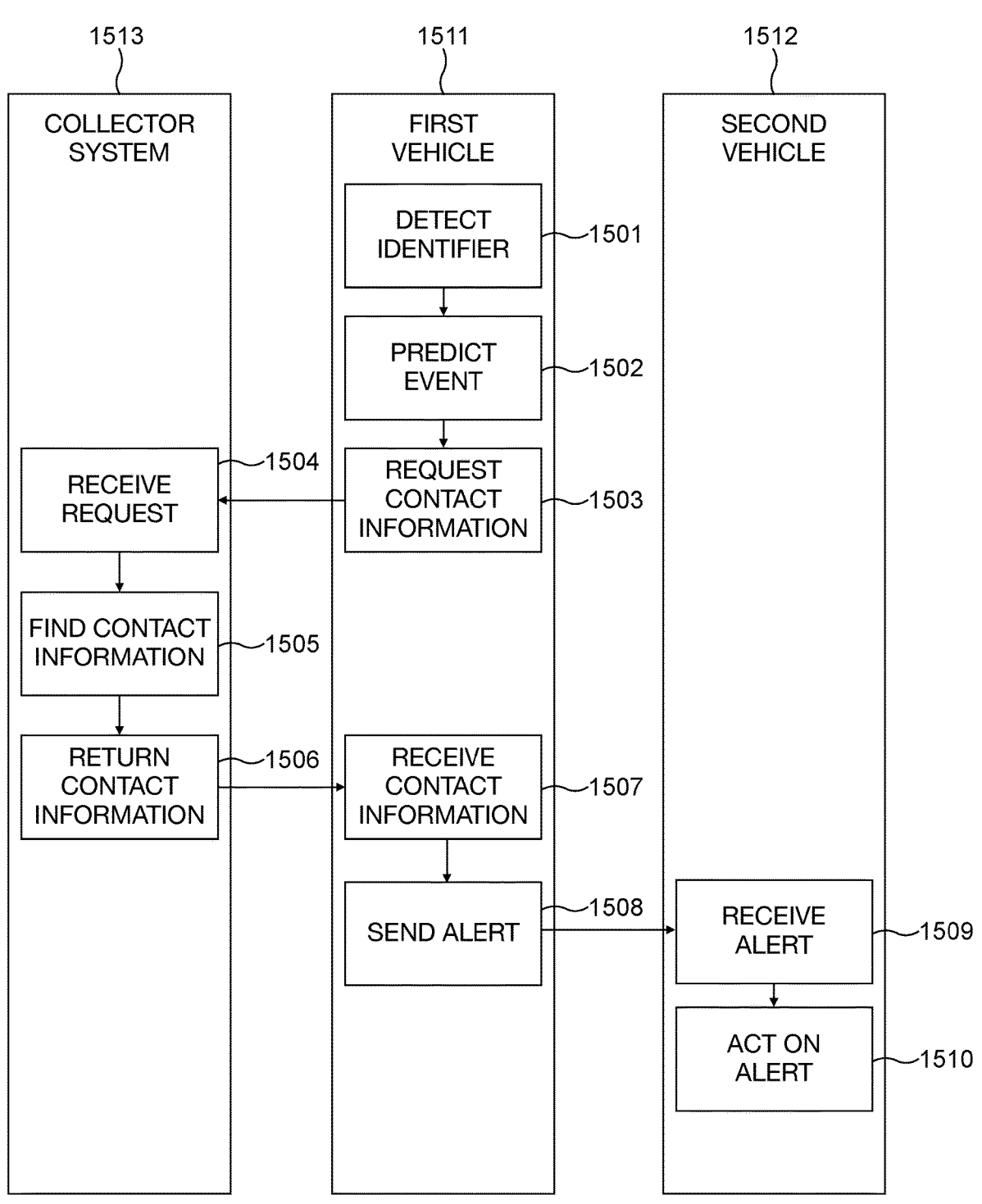
FIG. 15 is a schematic illustration of a method of warning a vehicle according to some embodiments.

In some embodiments and referring to FIG. 15, a first vehicle 1511 has a camera and a view of an environment. The first vehicle 1511 may detect an identifier at step 1501 of a second vehicle 1512 in video recorded by the camera. The first vehicle may analyze the video and predict an event at step 1502. For example, the first vehicle may predict that a third vehicle will impact the second vehicle. The first vehicle may use the identifier to request contact information of the second vehicle at step 1503. The request may be received by a collector system 1513 at step 1504. The collector system may use the identifier to find contact information of the second vehicle at step 1505 and may return that contact information to the first vehicle at step 1506. Upon receiving the contact information at step 1507, the first vehicle may send an alert to the second vehicle at step 1508. Upon receiving the alert at step 1509, the second vehicle may act on the alert at step 1510.

In some embodiments, the second vehicle may react to predicted events by flashing lights, honking a horn, physical movement, or other accident avoidance mechanisms at step

1510. In another example, the system may include functionality to predict an impeding collision and trigger another nearby vehicle's camera to record video, thereby capturing additional views of the collision. In this example, the collection of data from the local camera at step 1304 of FIG. 13 may include turning the local camera on in response to the alert at step 1510. The system may include functionality for real-time detection of identifying information (e.g., license plates), recognize an act of vandalization, identify pre-existing vehicle damage/analysis of new damage, identification of other events such as a child left in car.

Figure 16:
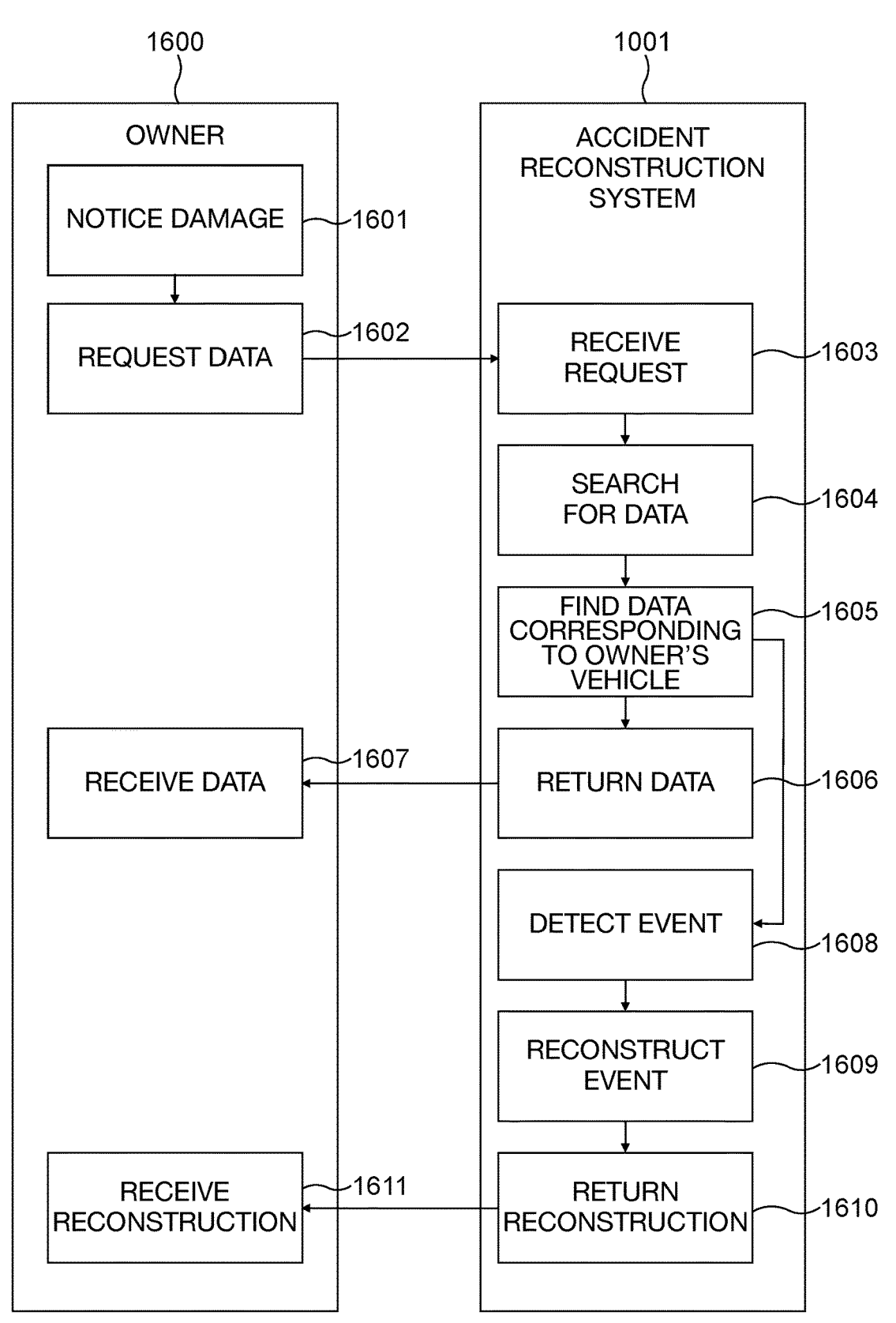
FIG. 16 is a schematic illustration of a method of operating an accident construction system according to some embodiments.

FIG. 16 is a schematic illustration of a method of operating an accident construction system that maintains a database of videos collected by a plurality of cameras according to some embodiments. In some examples, an owner 1600 of a vehicle may notice damage to a vehicle at step 1601. The owner may make a request at step 1602. The request may include a parameter such as the owner's name, identifying information about the vehicle, location data where the owner suspects the damage to have occurred, and a time window that the owner suspects the damage to have occurred in. For example, the owner may request data corresponding to the vehicle for a past day or a past week, at a location of a parking lot where the vehicle is typically parked between 9:00 a.m. and 5:00 p.m.

The accident reconstruction system 1001 may receive the request at step 1603 and search for data at step 1604. The search for data may include searching a database, such as database 1202, for data corresponding to the parameter contained in the request. The search for data may include searching a database of the accident reconstruction system 1001, such as database 1202, searching a distributed set of memories, such as memory of connected vehicles, or searching another database or memory. The search for data may be constrained by a number of parameters such as a time window or a place specified in the request received from the owner.

In some examples, the search for data at step 1604 may be a search for contact information matching a wireless signal identifier of a local vehicle captured by the owner's vehicle. In another example, the search for data at step 1604 may be a search for contact information of a local vehicle matching a time and a place specified in the request of the owner. For example, this local vehicle, detected in an area of the owner's vehicle at a time and place specified by the owner, may have captured video of an event in which the owner's vehicle was damaged. Upon finding matching contact information, the accident reconstruction system 1001 may retrieve video data associated with the local vehicle. The accident reconstruction system 1001 may return this video data to the owner.

At step 1605 the accident reconstruction system 1001 may find data corresponding to the owner's vehicle. For example, the video data matching the searched for parameter may be further searched for the owner's vehicle. The owner's vehicle may be found in the video using known information about the vehicle. The information about the vehicle may have been made available to the accident reconstruction system 1001 during an enrollment of the user. In one example, the accident reconstruction system 1001 may use object detection methods and the information known about the vehicle to find the vehicle in the video matching the searched for parameter. In one example, the accident reconstruction system 1001 may search for a vehicle matching the make and model of the user's vehicle, the color of the vehicle, the model year of the vehicle, a license plate of the vehicle, or a wireless signal identifier of the vehicle recorded in the data collected by the accident reconstruction system. Thus, the accident reconstruction system 1001 may be able to find data on the owner's vehicle. As described herein, the data may have been provided by, for example, the owner's vehicle, another vehicle, or another sensor.

At step 1606, the accident reconstruction system 1001 may return any identified data to the owner. For example, the identified data may be returned in an electronic communication, by providing a link to the identified data stored in cloud storage. The owner may receive the returned data at step 1607.

In some examples, the accident reconstruction system 1001 may detect an event in the identified data at step 1608. For example, the accident reconstruction system 1001 may detect an event in the identified data as in step 1401. The accident reconstruction system 1001 may reconstruct the event at step 1609 using the identified data from step 1605. Various methods for reconstructing the event may be used, such as those described in connection with step 1308 or FIG. 10.

At step 1610, the reconstruction may be returned to the owner. The owner may receive the reconstruction at step 1611. For example, the reconstruction may be returned in an electronic communication, by providing a link to the identified data stored in cloud storage.

Accordingly, the owner may use the accident reconstruction system 1001 to search for and retrieve data about a vehicle. In some examples, the owner may use the accident reconstruction system 1001 to reconstruct an event involving the vehicle. The event may depict damage to the vehicle. The damage may be the result of, for example, a car accident involving another car, an impact with object, or an animal. The damage may be the result of, for example, weather such as hail, wind damage, or water damage.

As used herein, "facilitating" an action includes performing the action, making the action easier, enabling a device to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of using a network of sensors in reconstructing an accident comprising:

recording, by a first vehicle, a first video of the accident using a first camera comprising a first field of view and a first time stamp;

detecting, by the first vehicle, a presence of a second camera associated with a second vehicle at the accident;

obtaining, by the first vehicle, contact information associated with the second camera using optical character recognition of a license plate associated with the second vehicle upon determining the presence of the second camera at the accident;

retrieving, by the first vehicle, a second video of the accident from the second camera having a second field of view separate from the first field of view and a second time stamp separate from the first time stamp using the contact information, the first time stamp and the second time stamp covering the accident; and reconstructing, by the first vehicle, the accident by stitching together the first video and the second video to create an impression of a single video of the accident.

2. The method of claim 1, further comprising:

enrolling the first camera with a database system; and enrolling the second camera with the database system, wherein the enrolling of the second camera comprises recording the contact information associated with the second camera.

3. The method of claim 1, wherein detecting the presence of the second camera at the accident comprises detecting a wireless signal identifier of the second camera, and wherein obtaining the contact information associated with the second camera further comprises providing the wireless signal identifier to a database system storing the contact information and the wireless signal identifier.

4. The method of claim 1, wherein detecting the presence of the second camera at the accident comprises detecting an identifier of the second camera in the first video, and wherein obtaining the contact information associated with the second camera further comprises providing the identifier to a database system storing the contact information and the identifier.

5. The method of claim 4, wherein retrieving the second video of the accident using the contact information further comprises:

recording, by the first vehicle of the first camera, a first location and the first time stamp associated with the accident; and providing, using the contact information, the first location and the first time stamp associated with the accident to a second vehicle including the second camera.

6. The method of claim 1, wherein detecting the presence of the second camera at the accident comprises:

recording, by the first vehicle of the first camera, a first location and the first time stamp associated with the accident; and providing the first location and the first time stamp associated with the accident to a database system storing the contact information and a second location and the second time stamp associated with the second camera matching the first location and the first time stamp, wherein retrieving the second video of the accident using the contact information further comprises sending a request, using the contact information, to the second camera for the second video.

7. The method of claim 1, further comprising making the reconstruction of the accident available.

8. A method of operating an accident reconstruction system that maintains a database of videos collected by a plurality of cameras, the method comprising:

receiving video data collected by the plurality of cameras disposed in a given environment and associated with a plurality of users enrolled in a data sharing service that includes an authorization to allow access to recorded data among the plurality of users wherein the video data are associated with identifying data, each camera in the plurality of camera comprising a given field of view and a given time stamp, the given time stamps covering the accident;

stitching together the video data from the plurality of cameras to create continuous video data of the accident that creates an impression of a single video of the accident;

receiving, from a first user of the plurality of users, a user request for data about a vehicle of the first user, the request including at least one parameter;

searching, using the at least one parameter, the continuous video data for video data matching the at least one parameter;

finding a portion of the continuous video data matching the at least one parameter that depicts the vehicle of the user; and returning the portion of the continuous video data matching the at least one parameter and depicting the vehicle of the user to the first user.

9. The method of claim 8, further comprising enrolling each of the plurality of users with the accident reconstruction system, wherein the enrollments comprise respective contact information associated with the plurality of cameras.

10. The method of claim 8, wherein searching, using the at least one parameter, the continuous video data for video data matching the at least one parameter comprises detecting the plurality of cameras at a time and a place specified by the at least one parameter.

11. The method of claim 8, wherein the video data received by the accident reconstruction system includes location and time data associated with the video data.

12. The method of claim 8, wherein the continuous video data comprise a reconstruction of the accident comprising video data received from two or more camera in the plurality of cameras, each camera in the plurality of camera having a different field of view and a different time stamp.

13. The method of claim 12, further comprising making the reconstruction of the accident available to the user.

\* \* \* \* \*